Figure 1:
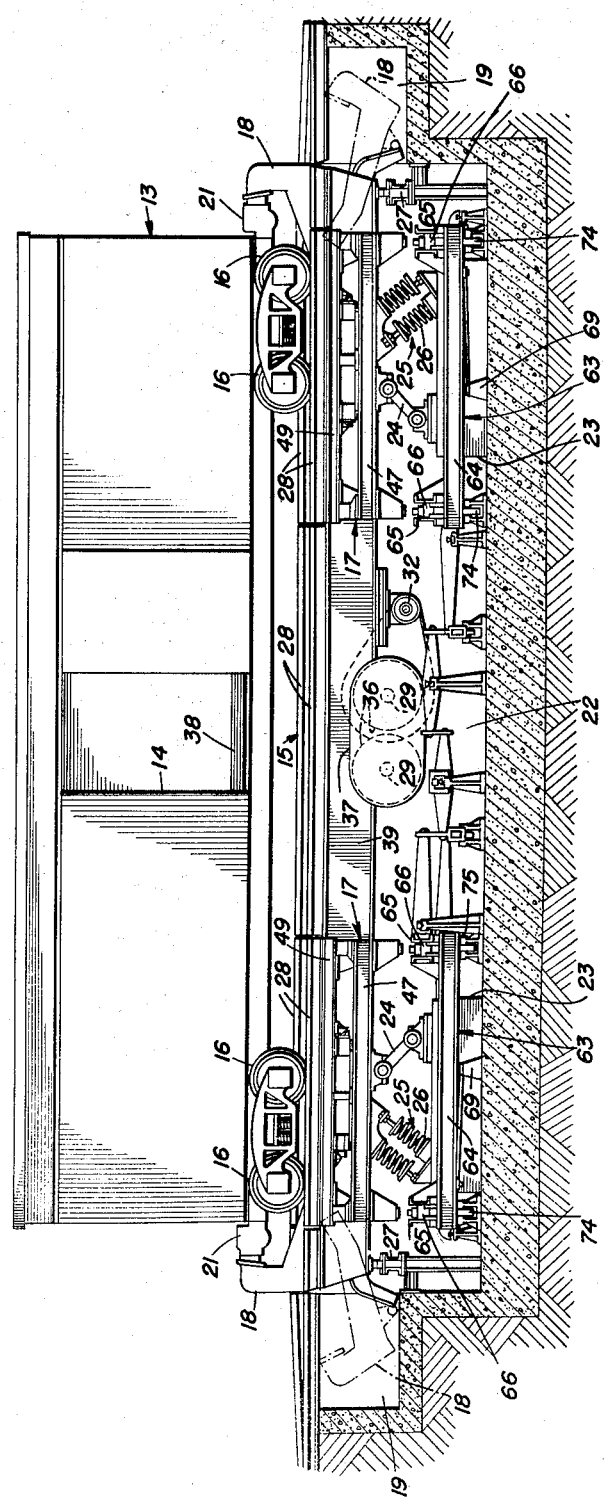

Jan. 6, 1959 W. E. ERICKSON 2,867,337
RAILWAY CAR WEIGHING AND UNLOADING APPARATUS
Filed Aug. 29, 1957 9 Sheets-Sheet 1

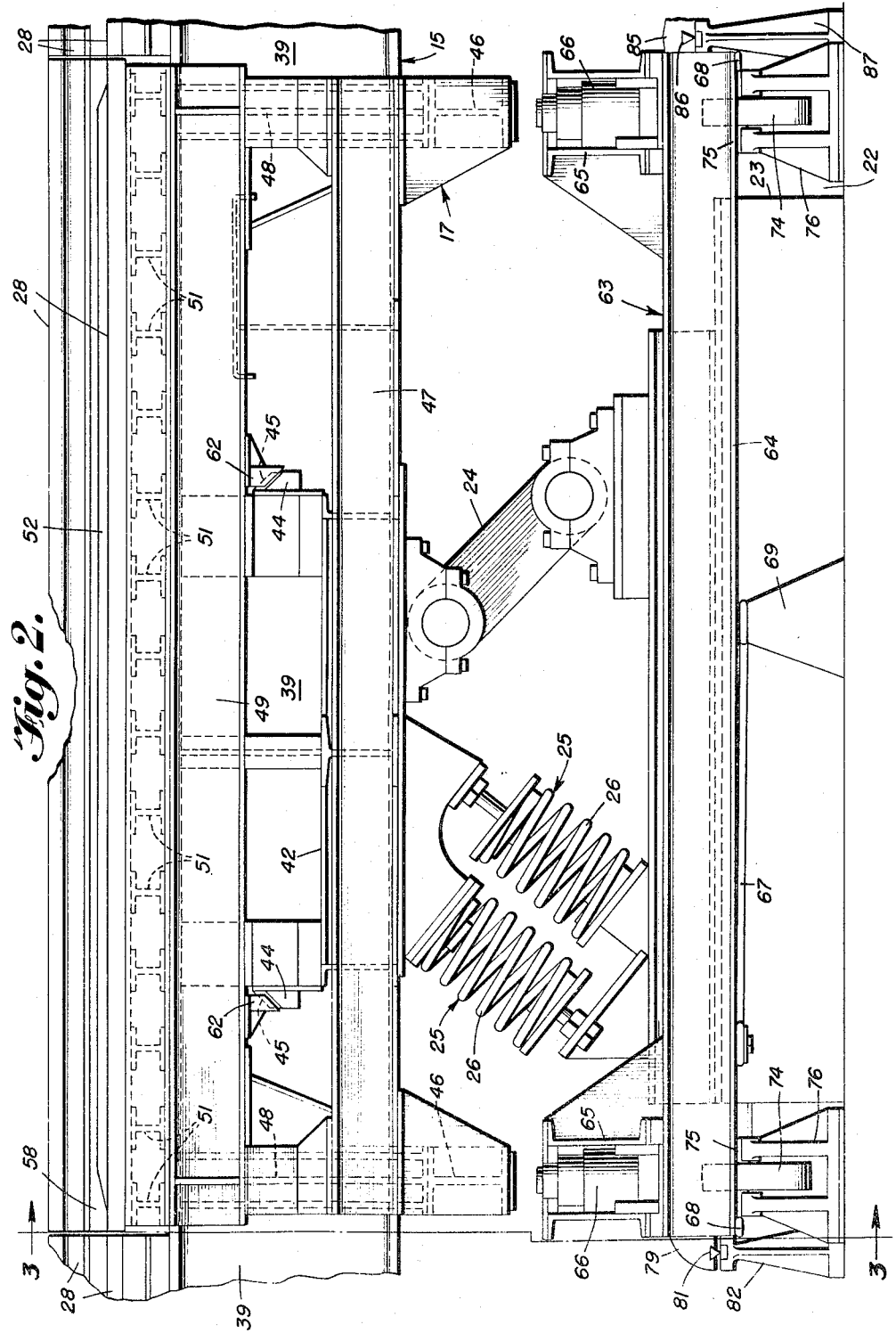

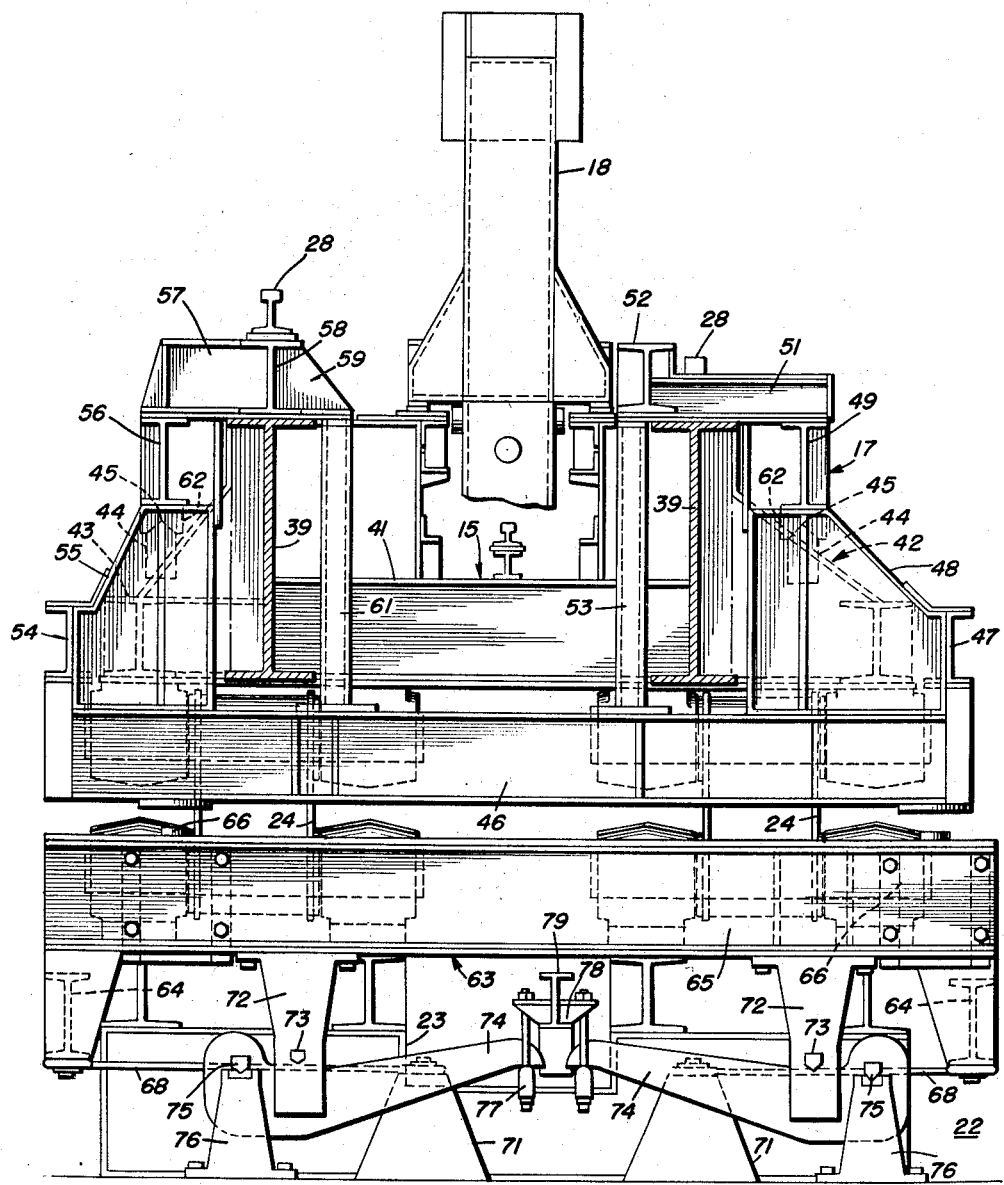

Jan. 6, 1959 W. E. ERICKSON 2,867,337
RAILWAY CAR WEIGHING AND UNLOADING APPARATUS
Filed Aug. 29, 1957 9 Sheets-Sheet 4
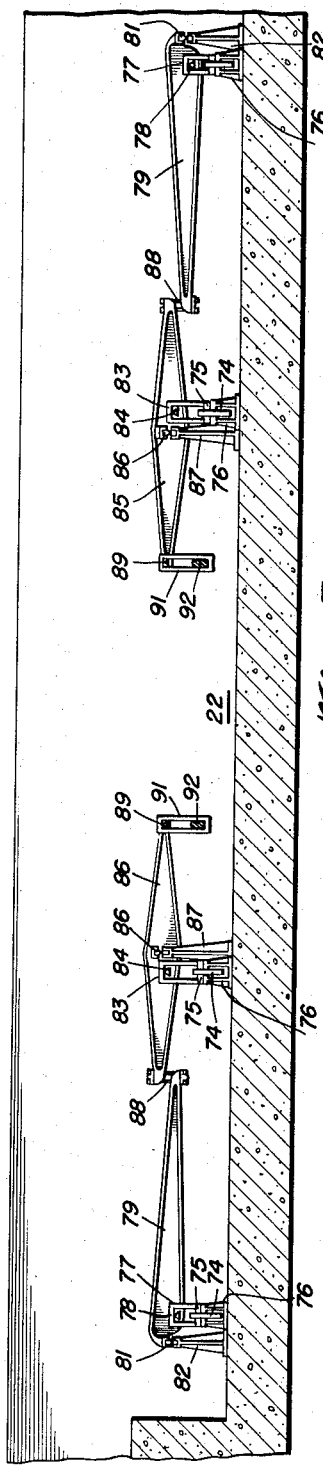
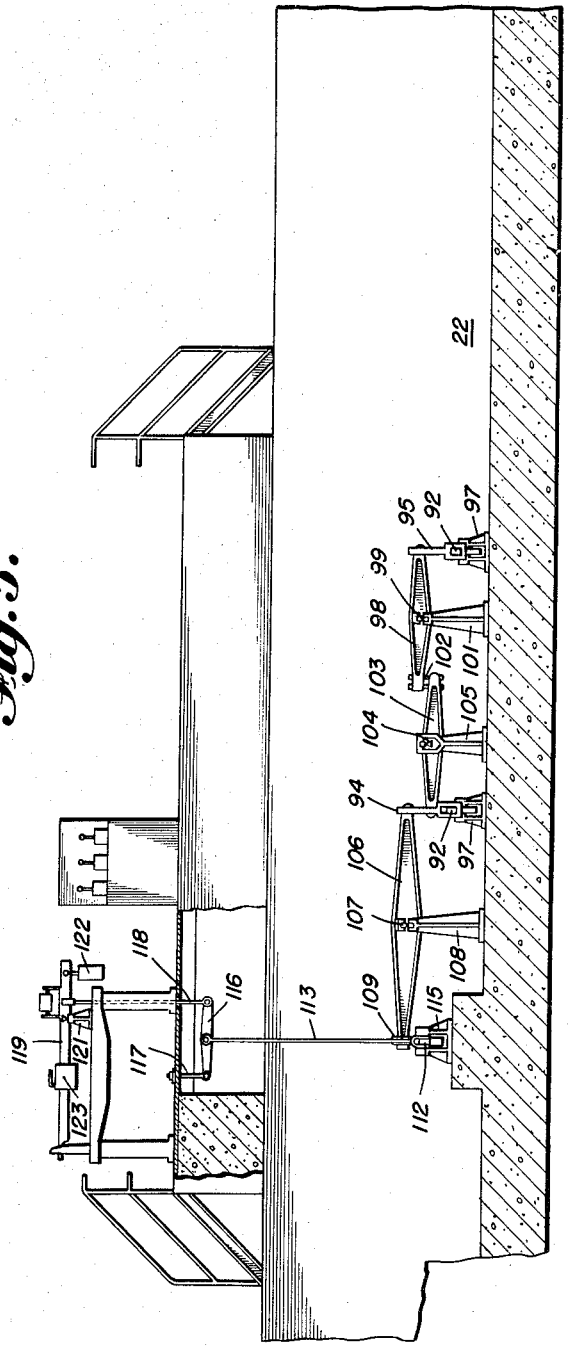

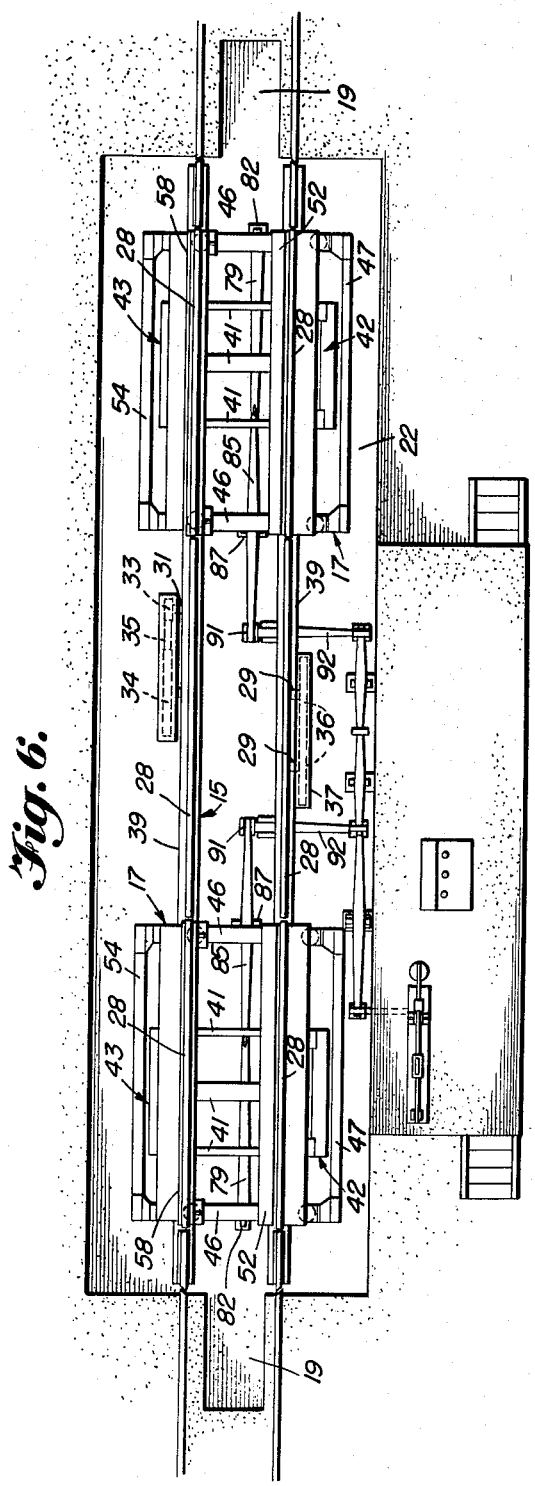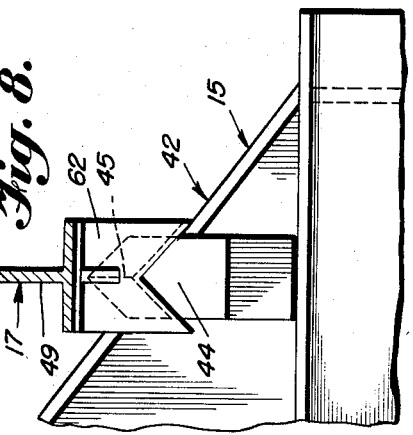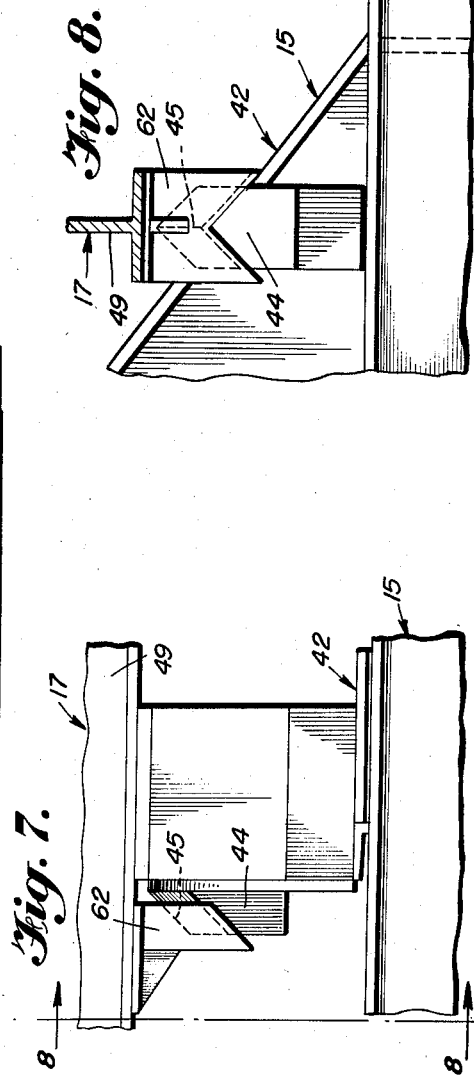

Jan. 6, 1959 W. E. ERICKSON 2,867,337
RAILWAY CAR WEIGHING AND UNLOADING APPARATUS
Filed Aug. 29, 1957 9 Sheets-Sheet 6

BY

Jan. 6, 1959 W. E. ERICKSON 2,867,337
RAILWAY CAR WEIGHING AND UNLOADING APPARATUS
Filed Aug. 29, 1957 9 Sheets-Sheet 7

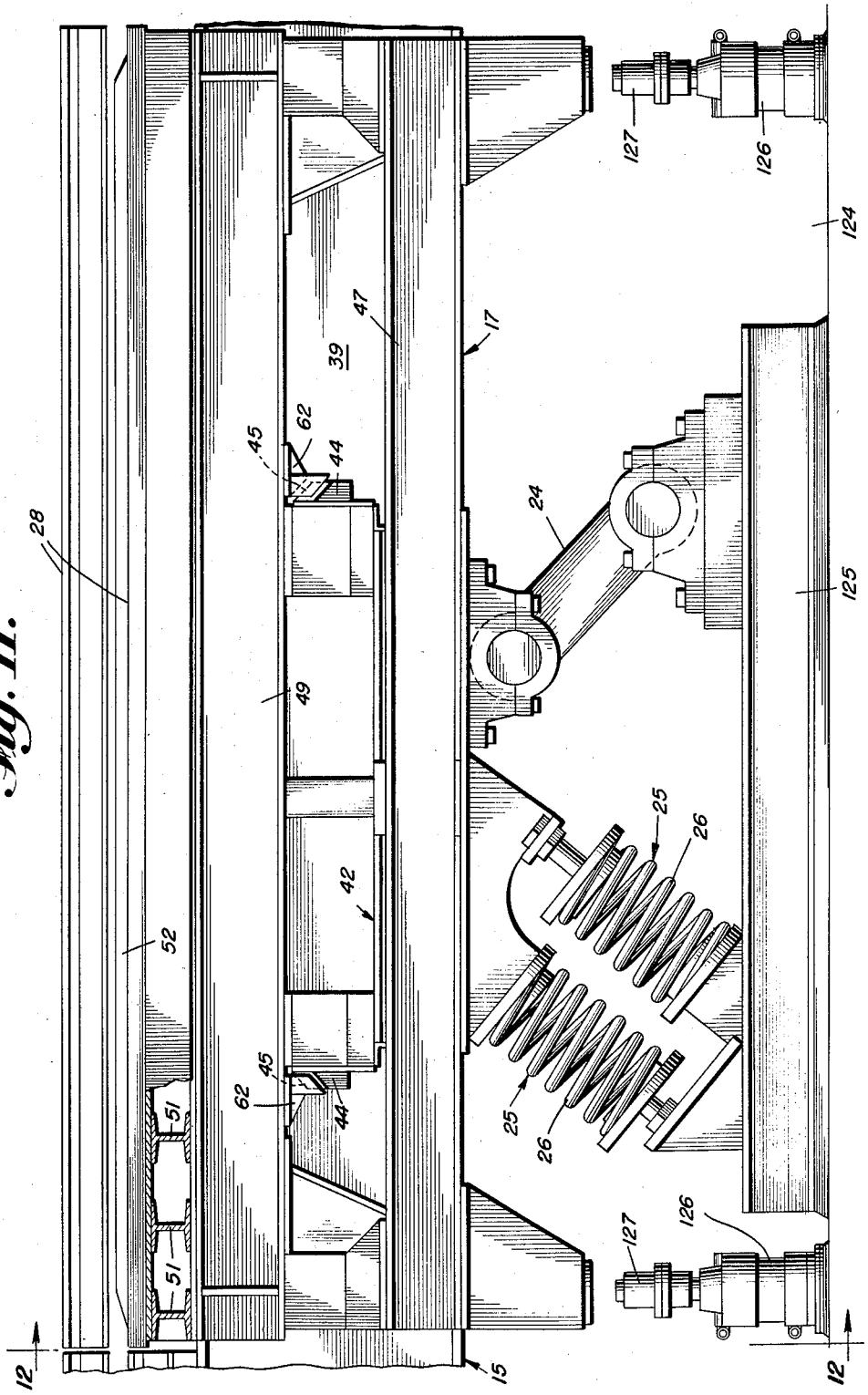

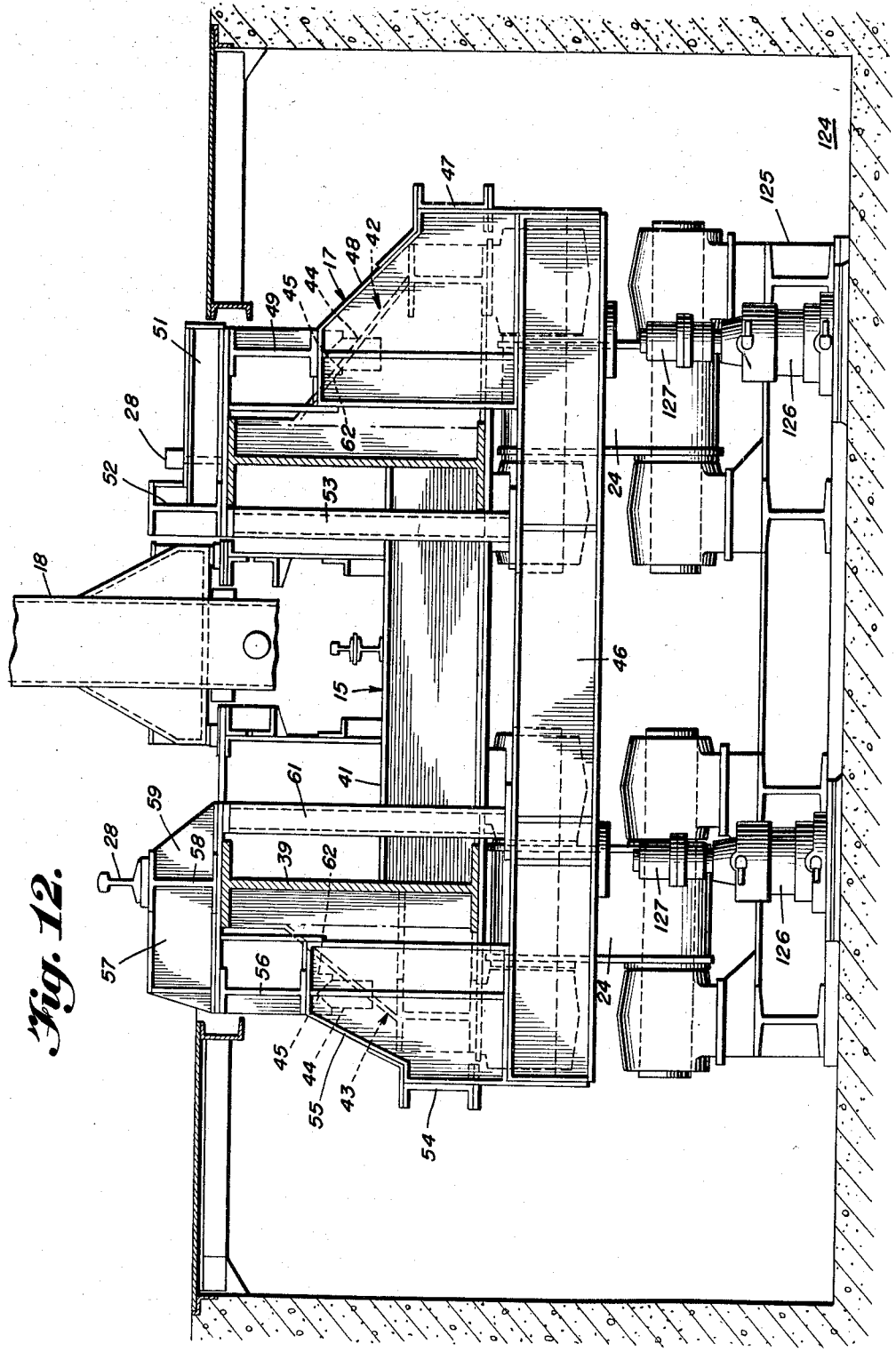

United States Patent Office 2,867,337
Patented Jan. 6, 1959

2,867,337

RAILWAY CAR WEIGHING AND UNLOADING APPARATUS

Willard E. Erickson, Chicago, Ill., assignor to Link-Belt Company, a corporation of Illinois Application August 29, 1957, Serial No. 681,019

12 Claims. (Cl. 214—2)

This invention relates to new and useful improvements in apparatus for weighing and unloading material from a railway car and deals more particularly with a combined track scale and unloading device for weighing, unloading the material from, and again weighing a railway car at a single operating station.

There are many existing grain elevators, and the like, where a track scale positioned in a shallow pit beneath the rails of a siding is employed to weigh incoming, loaded railway cars. After the cars are weighed, they are moved to an unloading site where the material is removed from the car and the empty car is then moved to a second track scale or returned to the first scale if only one scale is provided. The weight of the empty car is then determined, and this weight is deducted from the weight of the loaded car to determine the weight of the material unloaded from the car.

It will be readily apparent that installations of the above described type are not well suited to the rapid and efficient handling of railway cars. For example, it is necessary in such installations that the car be moved twice for weighing operations and once for unloading. Positioning the car for each of these operations, of course, requires time, labor and equipment. Further, if the cars are to be moved with any degree of continuity, two track scales and the pits therefor will be required. Even if a single track scale and pit is employed, the use of conventional unloading apparatus will generally require the provision of a second pit.

It is the primary object of this invention to provide apparatus for weighing, unloading and reweighing railway cars at a single operating station.

A further important object of the invention is to provide a pit mounted railway car weighing and unloading apparatus wherein the combined apparatus is mounted in a single pit and is operable to selectively weigh or unload the car.

Another important object of the invention is to provide railway car weighing and unloading apparatus which unloads the material from the car by vibrating the latter and which weighs the car before and after the unloading operation, the weighing portion of the apparatus being isolated from the vibratory shocks of the unloading operation.

Still another object of the invention is to provide apparatus for the combined weighing and unloading of material from a railway car, the apparatus requiring but a single track pit and necessitating only one positioning operation for the combined procedures.

Other objects and advantages of the invention will be apparent during the course of the following description.

Figure 9:
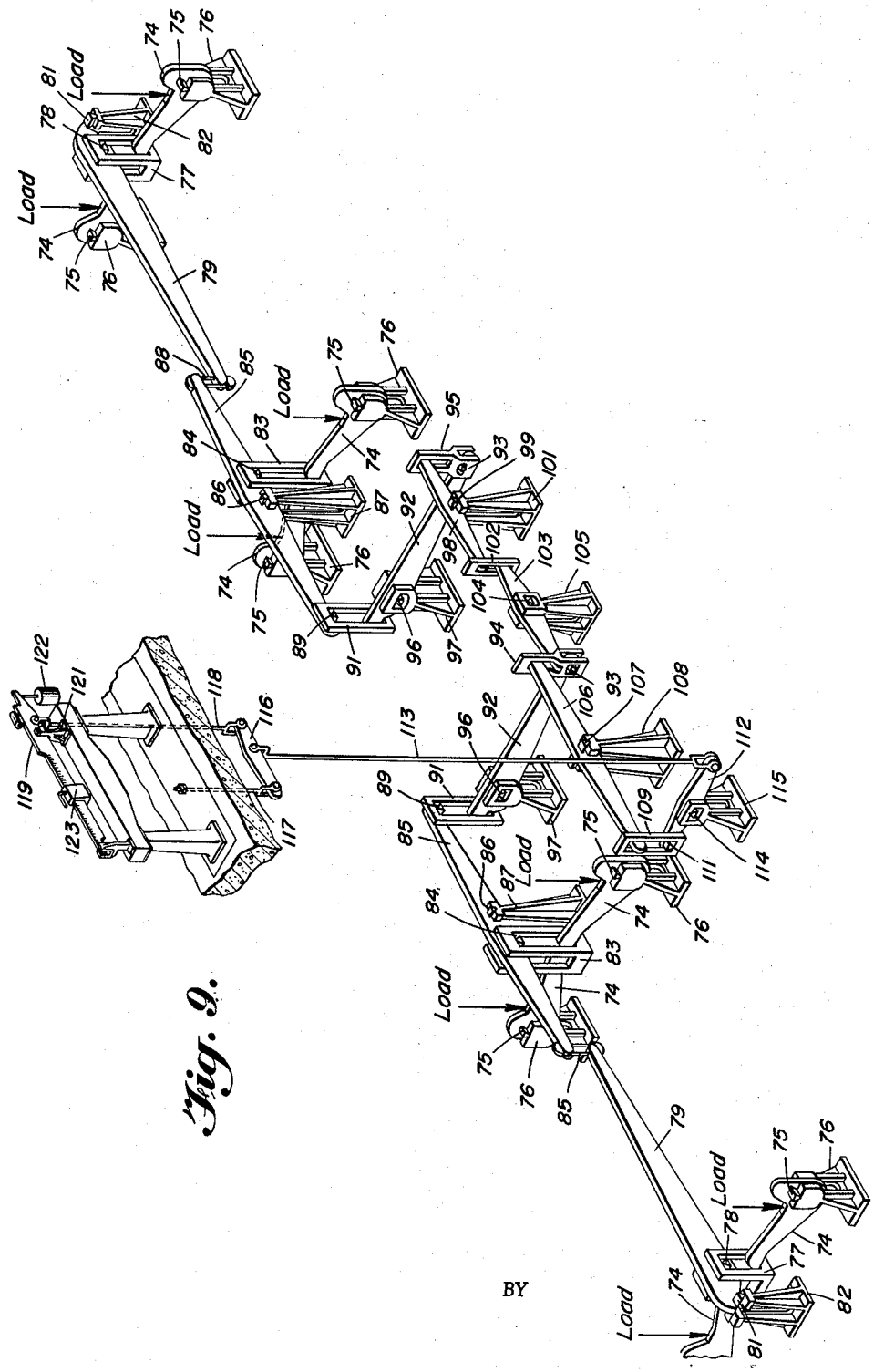
Figure 10:
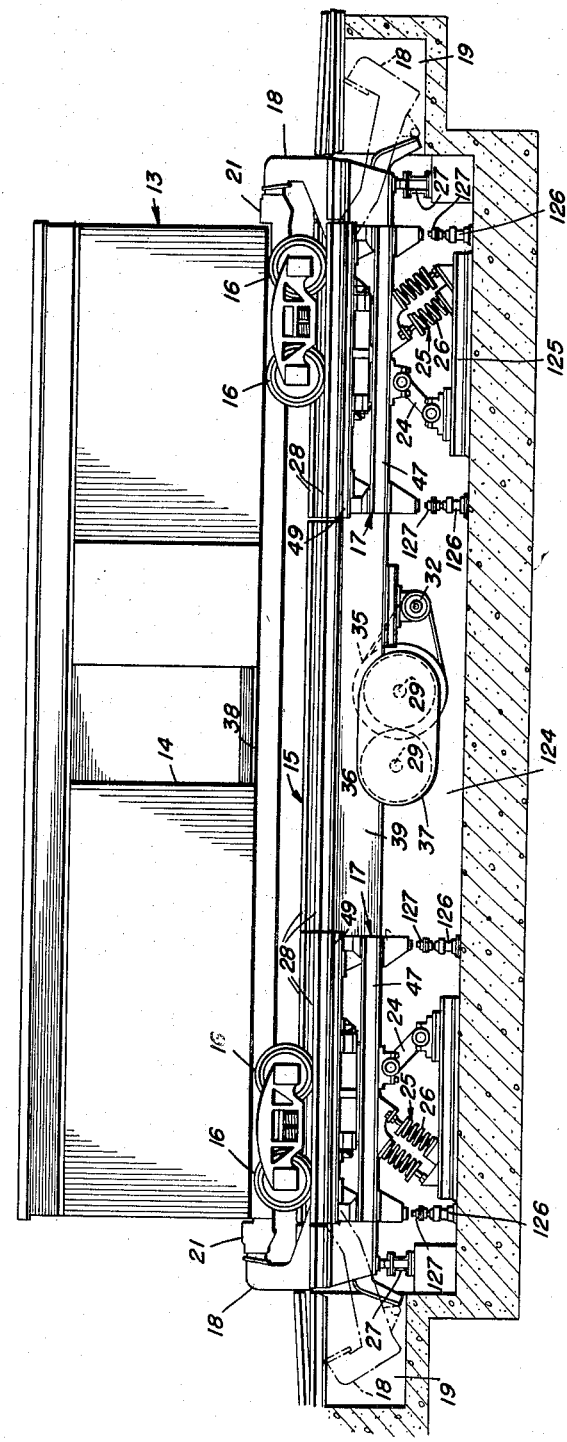

In the accompanying drawings, forming a part of this specification and in which like reference characters are employed for designating like parts throughout the same, Figure 1 is a side elevational view of a railway car positioned on a weighing and unloading device embodying the invention, Figure 2 is an enlarged side elevational view showing one end portion of the device of Fig. 1, Figure 3 is a vertical sectional view taken on line 3—3 of Fig. 2, Figure 4 is a side elevational view of the main, end and middle levers of the scale lever system employed by the device of Fig. 1, Figure 5 is a side elevational view of the extension levers employed in the scale lever system, Figure 6 is a top plan view of the device illustrated in Fig. 1 with the car removed, Figure 7 is an enlarged fragmentary view of one of the wedging blocks and guides for positioning the secondary bases on the primary base, Figure 8 is a vertical sectional view taken on line 8—8 of Fig. 7, Figure 9 is a perspective view of the complete lever system employed in the scale of the device of Fig. 1, Figure 10 is a side elevational view of a modified weighing and unloading device with a railway car positioned thereon, Figure 11 is an enlarged side elevational view showing one end portion of the device of Fig. 10, and Figure 12 is a vertical sectional view taken on line 12—12 of Fig. 11.

In the drawings, wherein for the purpose of illustration are shown the preferred embodiments of the invention, and first particularly referring to Fig. 1, there is shown a railway box car 13 having a side opening 14 through which material is to be removed from the car. The car 13 is centered longitudinally of a primary base designated in its entirety by the reference character 15 and the wheels 16 of the car rest entirely upon and are supported by secondary bases 17 which rest upon and are supported by the primary base. Clamping members 18 are carried by the primary base 15 and are movable between retracted positions in the pits 19, as illustrated by broken lines in Fig. 1, and operative positions in clamping engagement with the couplers 21 at opposite ends of the car 13. It will be readily apparent that, when the clamping members 18 are in the pits 19, the car 13 will be free to move onto the primary base 15 and that subsequent movement of the clamping members into their operative positions will cause the car to be centered longitudinally of the primary base and will maintain the car in its centered position during movements of the base.

The primary base 15 longitudinally spans an elongated pit 22 that has two mounting pedestals 23 arranged at the opposite end portions thereof for pivotally mounting the arms 24 which extend upwardly and outwardly from their mountings for pivotal connection to opposite end portions of the primary base. Reactor assemblies 25 are mounted on each of the two pedestals 23 and include springs 26 which are compressed between the mounting pedestal and the adjacent end portion of the primary base 15 to apply reactive forces to the primary base in a direction that is substantially normal to the arms 24 which support the corresponding end portion of the base. Hydraulic jacks 27 are also mounted in the pit 22 for engaging opposite end portions of the primary base 15 to hold the latter in a stationary position.

The primary base 15 and secondary bases 17 each has mounted thereon a pair of parallel rails 28 for receiving the wheels 16 of the car 13 and, by reference to Fig. 1, it will be seen that one of the rails 28 is elevated relative to the other so that the car is supported in a laterally tilted position.

As illustrated in Figs. 1 and 6, two transversely arranged shafts 29 are suspended for rotation on the bottom side of the primary base 15. By reference to Fig. 6, it will be seen that the two shafts 29 are arranged in parallel relationship and are spaced at equal distances on opposite sides of the transverse center line of the primary base 15. One of the shafts 29 has one of its end portions drivingly connected to the drive shaft 31 of a motor 32 by a driving sprocket 33, a driven sprocket 34 and a drive chain 35. The second shaft 29 is drivingly connected to the driven shaft 29 by a pair of meshing gears 36 which are mounted on corresponding end portions of the two shafts within a housing 37.

Each of the two shafts 29 has mounted thereon an eccentrically positioned, or unbalanced, weight, not shown, and the two shafts are keyed to each other by their gears 36 so that the directions of unbalance of the weights of the two shafts correspond only in opposite horizontal directions. It will be readily apparent, therefore, that operation of the motor 32 will cause the two shafts 29 to rotate in opposite directions so that the forces developed by rotation of their unbalanced weights will apply vibratory forces to the primary base 15 alternately in opposite horizontal directions.

Assuming that the jacks 27 have been lowered to release the primary base 15 for movement, the application of such forces to the base will cause the arms 24 to oscillate about their pivotal connections to the mounting pedestals 23 so that opposite end portions of the primary base will move alternately in opposite directions along paths which are inclined upwardly and inwardly. This movement of opposite end portions of the primary base 15 is opposed by compression of the springs 26 of the reactor assemblies 25 associated with the downwardly moving end portion of the primary base 15. The reactor assemblies 25, therefore, overcome the inertia forces developed by the vibratory movements of the primary base 15, secondary bases 17 and car 13 resting thereon.

The vibratory movement thus imparted to the primary base 15 will be transmitted to the car 13 and will cause the floor 38 of the car to move in the same manner as the primary base. In other words, opposite end portions of the floor 38 will move alternately upwardly and inwardly and downwardly and outwardly to impart a conveying action to the material resting on the floor which will cause the material in opposite end portions of the car to move in opposite directions toward the center portion of the car from which the material will flow outwardly through the door 14 at the lower side of the tilted car. The material flowing out of the car door 14 may be carried away from the car by any suitable conveying or elevating mechanism, not shown.

Referring now to Figs. 2 and 3 for a detail description of the primary base 15 and secondary bases 17 resting thereon, it will first be noted that the following description of the left-hand secondary base as viewed in Fig. 1 is equally applicable to the right-hand secondary base and that corresponding reference characters are used to designate the corresponding parts of the two secondary bases. The primary base 15 includes two longitudinally extending I-beams 39 which are rigidly connected to each other by transversely extending members 41 to form a rigid structure which spans the entire length of the pit 22. Rails 28 are mounted above the tops of the two beams 39 between the secondary bases 17 and outwardly of the secondary bases, one of the rails being mounted at a greater elevation than the other rail to tilt the car 13 as it moves along the rails. At each end portion of the base 15, laterally outwardly projecting frames 42 and 43 provide a broadened mounting section to which the arms 24 are connected. The reactor assemblies 25 also bear against the mounting section but are omitted from Fig. 3 to clarify the arrangement of the arms 24.

At each end of each of the two frames 42 and 43, there is provided a wedging block 44 as illustrated in Figs. 7 and 8. The top of each wedging block 44 is ridged to provide a peak 45 which slopes downwardly and longitudinally outwardly from its associated end of the frame 42 or 43 and the surfaces at each side of the peak are inclined downwardly and laterally outwardly from the latter.

Referring now to Figs. 2 and 3 for a detail description of the secondary base 17 illustrated therein, it will be seen that a pair of longitudinally spaced I-beams 46 extend transversely beneath and project outwardly beyond the sides of the primary base 15 with the mounting section provided by the frames 42 and 43 therebetween. Extending longitudinally between and connecting the end portions of the beams 46 at the side of the primary base 15 which supports the lower rail 28 is a beam 47, the opposite end portions of which are connected through suitably reinforced end plates 48 to the transverse beams 46 and to a second longitudinally extending beam 49. The beam 49 is supported in an elevated position relative to the beam 47 by the end plates 48 and has connected to its top surface a plurality of laterally inwardly projecting members 51 which extend across and are adapted to rest upon the top of the adjacent beam 39. An I-beam 52 extends longitudinally of and is connected to the inner end portions of the members 51 and has its opposite end portions connected to the transverse beams 46 by vertical channel members 53 which extend downwardly along the inner side of the adjacent beam 39 of the primary base 15. The lower rail 28 of the secondary base 17 is mounted on the tops of the members 51 in vertical alignment with the beam 39 upon which the members normally rest.

At the opposite side of the primary base 15, the transverse beams 46 are similarly connected by a longitudinally extending beam 54 through suitably reinforced end plates 55 which are connected to and support a second longitudinal beam 56 in an elevated position relative to the beam 54. The top of the beam 56 has mounted thereon a plurality of laterally inwardly extending members 57 which overlie and are adapted to rest upon the top of the adjacent beam 39 of the primary base 15. The end portions of the members 57 which overlie the beam 39 are connected by a longitudinally extending beam 58 which supports the higher of the two rails 28 of the secondary base 17 in vertical alignment with the beam 39. The beam 58 is connected through gusset plates 59 to vertical member 61 which extends downwardly along the inner side of the adjacent beam 39 for connection to the transverse beams 46. It will be noted that, when the members 51 and the beam 58 at the inner ends of the members 57 rest upon the tops of the two beams 39 of the primary base 15, the transverse beams 46 of the secondary frame 17 are spaced downwardly from the bottoms of the beams 39 so that limited vertical movement may be imparted to the secondary base without interference from the beams 39 or the transverse members 41 connecting these beams. It will also be noted that the lengths of the rails 28 mounted on the secondary base 17 are such that the ends of these rails terminate in closely spaced relationship with aligned rails 28 of the primary base 15.

Mounted on the bottoms of the beams 49 and 56 opposite sides of the secondary base 17 are a pair of longitudinally spaced guide blocks 62 which are vertically aligned with the wedging blocks 44 carried by the primary base 15. As is best illustrated in Figs. 7 and 8, these guide blocks 62 have their bottom surfaces shaped to cooperate with the ridged upper surfaces of the wedging blocks 44 with which they are aligned. The guide blocks 62, therefore, will engage the wedging blocks 44 to guide vertical movement of the secondary base 17 into its proper position longitudinally of the primary base 15 as the member 51 and 57 of the secondary base are lowered into their seated positions on the tops of the beams 39 of the primary base.

Referring now to Figs. 1, 2 and 3 it will be seen that two rectangular scale platforms 63 are mounted in the pit 22 beneath the two secondary bases 17 and are entirely supported by a system of scale levers which will be later described. Each of the two scale platforms 63 has a pair of longitudinally extending side beams 64 that are arranged on opposite sides of and spaced laterally outwardly from the mounting pedestal 23 adjacent thereto. Laterally extending channel beam assemblies 65 extend between and are connected to the tops of the corresponding end portions of the side beams 64 and are spaced from the opposite ends of the mounting pedestal 23.

At opposite end portions of each channel beam assembly 65 there is provided a fluid motor, or hydraulic jack 66 which is vertically extensible to engage the overlying end portion of the transverse member 46 of the secondary base 17. The hydraulic jacks 66 at the four corners of the scale platform 63, therefore, may be extended to engage the overlying corner portions of the secondary base 17 and to lift the secondary base from its position at rest on the primary base 15. The weight of the secondary base 17 and the car 13 supported thereon is thereupon applied to the scale platform 63 and to the scale lever system supporting the scale platform.

It will be readily apparent that return of the hydraulic jacks 66 to their original positions, as illustrated in Fig. 2, will cause the secondary base 17 to be returned to its position of rest on the primary base 15 so that the scale platform 63 is completely disengaged from any portion of the primary or secondary bases. The scale platform 63 is held against lateral or longitudinal movement by longitudinally arranged tie rods 67 and laterally extending tie rods 68 which are rigidly connected to the scale platform and to mounting blocks 69 and 71, respectively.

As illustrated in Fig. 3, each scale platform 63 is supported on the scale lever system by mounting posts 72 which are mounted on and depend from laterally spaced points on the bottoms of the transverse channel beam assemblies 65. Each of the mounting posts 72 is provided with a pivot 73 through which the weight or load on the scale platform is transferred to the scale lever system.

Referring now to Figs. 4 to 6, inclusive, and 9 for a detail description of the scale lever system, and first particularly referring to Fig. 9, it will be understood that the pivots 73 of the mounting posts 72 at opposite ends of the scale platforms 63 are supported at the points indicated by the legends "Load" on opposed pairs of main levers 74. The pivots 75 of such levers rest upon fulcrum stands 76 which are located laterally outwardly of the points of "Load" application to the levers 74. The pairs of levers 74 at the longitudinally outer ends of the scale platforms 63 have their adjacent inner ends supported on saddles 77 which are in turn suspended from the load pivots 78 carried by associated end levers 79. Adjacent its load pivot 78, each end lever 79 is provided with a fulcrum pivot 81 which is arranged longitudinally outwardly of the load pivot and is supported on a fulcrum stand 82.

The pairs of main levers 74 at the inner ends of the scale platforms 63 have their inner adjacent end portions supported on saddles 83 which are in turn suspended from the pivots 84 of the associated middle levers 85. Adjacent the pivot 84 of each middle lever 85, there is provided a fulcrum pivot 86 which rests upon fulcrum stand 87 to support the lever 85 at its center portion. The outer end portion of each middle lever 85 extends longitudinally into overlying relationship with the inner end of, and is connected to such by, a shackle 88. The inner end portion of each middle lever 85 extends longitudinally inwardly from the fulcrum stand 87 and is provided with a pivot 89 for suspending a saddle member 91.

A pair of transverse levers 92 are arranged with their inner end portions resting on and pivotally supported by the saddle members 91 and their outer end portions supported by pivots 93 which rest upon saddle members 94 and 95, the latter saddle member being associated with the right-hand transverse lever 92, as viewed in Fig. 9. Both of the saddle members 94 and 95 exert upwardly directed forces on their associated transverse levers, as will be later described. Both of the transverse levers 92 are provided with fulcrum pivots 96 which bear upwardly against the fulcrum blocks 97 associated therewith to prevent upward movement of the transverse levers by the vertically directed forces applied to opposite end portions thereof.

The saddle member 95 is suspended from one end portion of an extension lever 98 which is supported at its middle portion by a pivot 99 that rests upon a fulcrum stand 101. The opposite end portion of the extension lever 98 has a shackle member 102 suspended therefrom for supporting one end portion of a second extension lever 103 the opposite end portion of which rests upon and is supported by the saddle member 94. The middle portion of the second extension lever 103 is provided with a pivot 104 which bears upwardly against the fulcrum stand 105 to maintain a fixed pivotal axis for this extension lever. The saddle member 94 associated with the second extension lever 103 and with one of the transverse levers 92 is suspended from one end portion of a third extension lever 106 the middle portion of which is supported by a pivot 107 on the fulcrum stand 108. At the opposite end portion of the lever 106, a shackle 109 is provided for supporting the pivot 111 at one end portion of the transversely arranged extension lever 112. To the outer end portion of the lever 112, a vertically extending rod 113 is pivotally connected. A pivot 114 at the middle portion of the lever 112 bears upwardly against the fulcrum stand 115 to provide a fixed pivot for this lever.

The upper end of the rod 113 is pivotally connected to the middle portion of a shelf lever 116 one end portion of which is pivotally suspended from an anchor rod 117 and the opposite end portion of which is pivotally connected to the rod 118 which rises vertically therefrom for pivotal connection to the scale beam 119. The scale beam 119 is supported for pivotal movement on the fulcrum stand 121 adjacent the point of pivotal connection of the rod 118 and calibrating weights 122 are provided for balancing the scale lever system. The opposite end portion of the scale beam 119 is provided with marked graduations along which the poise 123 may be moved to balance any loads applied to the scale lever system and to indicate the weight of such loads by the position of the poise.

Considering now the manner in which the scale lever system functions to measure loads applied thereto by the scale platforms 63, it will be seen by reference to Fig. 9 that such loads will be distributed between the four main levers 74 which are arranged at the opposite ends of each scale platform. The loads applied to the longitudinally outwardly located pair of main levers 74 associated with each of the scale platforms 63 will apply a combined load to the saddle 77 associated therewith and this combined load will in turn be applied to the associated end lever 79.

The loads applied to the longitudinally innermost pair of main levers 74 associated with each scale platform 63 will similarly be combined and applied to the saddle member 83 associated therewith and through the saddle member to the middle lever 85 from which the saddle member is suspended. In addition, the middle lever 85 will have loads applied thereto by the end lever 79 through the shackle 88 in accordance with the combined loads applied to the end lever by the longitudinally outermost pair of main levers 74. The entire loads supported by the pairs of main levers 74 associated with each of the two scale platforms 63, therefore, will be ultimately transmitted to the middle lever 85 associated therewith and the loads applied to the two middle levers 85 will be combined through the two transverse levers 92 and the first and second extension levers 98 and 103, respectively.

From the saddle member 94 this combined load is transmitted by the third extension lever 106 to the transverse extension lever 112 and through the rod 113 to the shelf lever 116. Since the shelf lever is connected directly to the scale beam, movement of the poise 123 along the scale beam to balance the forces applied to the scale beam by the rod 118 will, when the lever system is properly balanced, indicate the total weight supported on the main levers 74.

Referring now to Figs. 10, 11 and 12 for a detail description of the modified form of the invention illustrated therein, it will be noted that the car 13, primary base 15, secondary bases 17, arms 24, reactor assemblies 25 and clamping members 18 are identical to those illustrated in Fig. 1 and that the same reference characters have been applied to the corresponding parts of these structures. The main pit 124 is shallower, however, than the pit 22 illustrated in Fig. 1 and the mounting pedestals 125 for supporting the arms 24 and reactor assemblies 25 at opposite ends of the pit have been lowered relative to the bottom of the pit. Further, the hydraulic jacks 27 for supporting the primary base 15 during movement of a car thereon have been mounted on a slightly modified structure within the pit 124.

The apparatus for unloading the car 13 of Fig. 10 is identical and functions in the same manner as that illustrated in Fig. 1 and neither the structure nor the operation of this apparatus for unloading material from the car will again be described.

The apparatus for determining the weight of the car 13 and the material therein for the modification illustrated in Figs. 10 to 12, inclusive, is provided by eight fluid motors 126 four of which are positioned for vertical extension beneath the four corner portions of each of the secondary bases 17. The four fluid motors associated with each secondary base 17, therefore, function as hydraulic jacks to lift the secondary base from its position at rest on the primary base 15 when pressure fluid is admitted to effect vertical extension of such motors. Mounted on the plunger of each fluid motor 126 is a load cell 127 through which the weight of the secondary base 17 and any load thereon is transmitted to the fluid motor for support thereby. In other words, the total weight supported by the eight load cells 127 associated with the fluid motors 126 is equal to the total weight of the two secondary bases 17 plus the car 13 and its contents. The load cells 127 are of a conventional design and will convert any compressive load thereon into an electrical impulse which, in turn, is converted into an indicated weight by an electronic instrument. This type of load cell is fully illustrated and described in an article entitled "Industrial Load Cells" appearing in the publication "Product Engineering" on page 111 of the March issue of 1949.

Both of the above described modifications of the invention operate in a similar manner as follows:

A loaded car 13 is positioned on the primary base 15 with its wheels 16 resting upon the secondary bases 17 while the clamping members 18 are in their retracted positions in the pits 19 and the jacks 27 are elevated to maintain the primary base in a stationary position. The fluid motors 66 of the form of the invention illustrated in Fig. 1, or the fluid motors 126 of the form illustrated in Fig. 10, is then actuated to lift the secondary bases 17 from their positions at rest on the primary base 15 and to thereby determine the weight of the loaded car 13. The fluid motors 66 or 126 are thereafter de-energized to lower the secondary bases 17 to their positions at rest on the primary base 15 and the clamping members 18 are moved into engagement with the couplers 21 of the car 13 to clamp the car on the primary base. The jacks 27 are then lowered to free the car and the primary base 15 for movement and the motor 32 is set in operation so that the unbalanced forces created by rotation of the shafts 29 will impart an oscillatory vibration to the primary base and the car 13 which will effect movement of the material in opposite end portions of the car in opposite directions toward and out of the center opening 14 of the car. When the car 13 has been unloaded, the jacks 27 are again extended to support the primary base in a stationary position and the clamping members 18 are moved a sufficient distance to release the couplers 21 of the car 13. The fluid motors 66 or 126 are then again operated to lift the secondary bases 17 from their positions at rest on the primary base 15 so that the weight of the empty car 13 may be determined. This weight, when deducted from the previously determined weight of the loaded car, will indicate the total weight of the material removed from the car. The secondary bases 17 are then returned to their positions at rest on the primary base 15 by operation of the motors 66 or 126 and the clamping members 18 moved into their fully retracted positions within the pits 19 so that the empty car 13 may be removed from the primary base 15 and replaced with a loaded car.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A device of the type defined, comprising a primary base having two spaced secondary bases normally resting thereon, said primary and secondary bases supporting aligned rails thereon for guiding the wheels of a railway car, said secondary bases being spaced to receive the two sets of wheels at opposite end portions of said car and being supported for vertical movements relative to the primary base, means for fastening a railway car to said primary base with its wheels resting on said secondary bases, means mounting said primary base for oscillatory movements to effect the removal of material from the car, means for vibrating said primary base, the secondary bases and the car as a unit to impart said oscillatory movements to the railway car, means for lifting said secondary bases and the car above said primary base, and means for measuring and registering the weight supported by said lifting means.

2. Apparatus as defined in claim 1 further characterized by the means for mounting the primary base comprising a plurality of pivotally mounted arms arranged in two spaced sets, the two sets of arms being inclined upwardly and outwardly in opposite directions from their pivotal mountings for pivotal connection of each set to an associated end portion of the primary base.

3. Apparatus as defined in claim 1 further characterized by means for positioning said secondary bases when resting on said primary base, comprising a plurality of wedging blocks mounted on said primary base and having inclined wedging surfaces, and a plurality of guides mounted on each secondary base and having inclined surfaces opposing and engaging the wedging surfaces of the wedging blocks.

4. Apparatus as defined in claim 3 further characterized by the means for moving said secondary bases vertically upwardly relative to the primary base comprising a plurality of fluid motors mounted for engaging each of said secondary bases at a plurality of spaced points to apply vertically directed forces thereto.

5. Apparatus as defined in claim 1 further characterized by the means for fastening the railway car to the primary base comprising a pair of clamping members movable between retracted positions beneath the top level of the base and operative positions in engagement with opposite ends of the car and with the car centered on the primary base and supported on the secondary bases.

6. Apparatus as defined in claim 1 further characterized by means supporting said secondary bases in fixed positions at rest on said primary base, said secondary bases being free for limited vertical movement relative to said primary base to provide complete clearance between the primary and secondary bases, and means associated with said supporting means for guiding movement of said secondary bases into their fixed positions of rest on said primary base.

7. A device of the type defined, comprising a primary base having two spaced secondary bases normally resting thereon, said primary and secondary bases supporting aligned rails thereon for guiding the wheels of a railway car, said secondary bases being spaced to receive the two sets of wheels at opposite end portions of said car and being supported for vertical movements relative to the primary base, means for fastening a railway car to said primary base with its wheels resting entirely on said secondary bases, means mounting said primary base for oscillatory movements of its opposite end portions alternately in opposite directions along oppositely inclined paths, said paths being inclined upwardly and inwardly relative to the ends of said primary base, means for vibrating said primary base, the secondary bases and the car as a unit to impart said oscillatory movements to the railway car for removing the material from the car, a scale platform arranged in underlying relationship with each one of said secondary bases, a system of scale levers supporting said scale platforms, means mounted on said scale platforms for engaging and lifting the associated secondary bases, means for applying a load to said scale lever system to balance the load applied thereto by said scale platforms when said secondary bases are lifted, and means for measuring said balancing load and registering the weight of the load supported by the scale platforms.

8. Apparatus as defined in claim 7 further characterized by said scale lever system comprising four pairs of oppositely arranged main levers spaced longitudinally of said primary base with the levers of each pair supporting laterally opposed corner portions of the scale platform mounted thereon, a pair of end levers for supporting the movable end portions of the pairs of main levers closest to opposite ends of the primary base, a pair of middle levers for supporting the movable end portions of the two middle pairs of main levers and of the two end levers, a system of extension levers connecting the movable end portions of said middle levers to each other, and a scale beam for receiving the load applied to said extension levers by the scale platforms.

9. Apparatus as defined in claim 7 further characterized by the means for engaging and lifting the secondary bases comprising a plurality of hydraulic jacks mounted on each scale platform for vertical extension.

10. A device of the type defined, comprising a primary base having two secondary bases normally resting thereon, said primary and secondary bases supporting aligned rails thereon for guiding the wheels of a railway car, said secondary bases being spaced to entirely receive the two sets of wheels at opposite end portions of said car and being supported for vertical movements relative to the primary base, means for fastening a railway car to said primary base with its wheels resting entirely on said secondary bases, means mounting said primary base for oscillatory movements of its opposite end portions alternately in opposite directions along oppositely inclined paths, said paths being inclined upwardly and inwardly relative to the ends of said primary base, means for vibrating said primary base to impart said oscillatory movements to the base and to the railway car thereon for removing the material from the car, means for lifting said secondary bases from said primary base, and load responsive means associated with said lifting means for supporting said secondary bases when the latter are lifted from said primary base and for registering the weight of the supported load.

11. Apparatus as defined in claim 10 further characterized by said load responsive means comprising a plurality of load cells responsive to the application of a weight thereto for measuring and indicating the value of said weight.

12. Apparatus as defined in claim 10 further characterized by said lifting means comprising a plurality of hydraulic jacks, and said load responsive means comprising a load cell mounted on each of said jacks for movement thereby into lifting engagement with the associated secondary base.

No references cited.